United States Patent
Berthagen

[11] 3,890,672
[45] June 24, 1975

[54] FRICTIONALLY ADJUSTABLE HINGE ASSEMBLY WITH NONROTATABLE HINGE PIN BEARING SLEEVE

[76] Inventor: Nils Ture Lennart Berthagen, Manadsvagon 74, S-175 42 Jarfalla

[22] Filed: June 14, 1974

[21] Appl. No.: 479,376

[30] Foreign Application Priority Data
Sept. 9, 1973 Sweden............................ 7312443

[52] U.S. Cl................ 16/141; 16/128 A; 351/121; 403/91; 403/145; 403/203; 403/243; 403/372
[51] Int. Cl............................................. E05d 11/08
[58] Field of Search...... 16/128 R, 128 A, 171, 140, 16/141, 132; 351/121; 403/372, 243, 91, 145, 203

[56] References Cited
UNITED STATES PATENTS

| | | | |
|---|---|---|---|
| 2,828,668 | 1/1958 | DeAngelis | 16/128 A |
| 2,939,168 | 6/1960 | Ferron | 16/128 A |
| 3,396,425 | 8/1968 | Metcalf | 16/128 A |

FOREIGN PATENTS OR APPLICATIONS
683,346 2/1930 France.................... 16/DIG. 33

*Primary Examiner*—Richard J. Scanlan, Jr.
*Attorney, Agent, or Firm*—Sughrue, Rothwell, Mion, Zinn & Macpeak

[57] ABSTRACT

A hinge assembly has a first arm 10 provided with an upstanding shaft 13 having a lower squared portion 13' and an upper threaded portion 13''. The shaft extends through a hole 15 in a second arm 11, receives a shouldered sleeve 16 having a squared opening which fits over the squared portion 13', and is topped by a nut 17. The height of the central bushing portion of the sleeve is greater than the thickness of the second arm extension defining the hole 15 to implement free rotation without any torque moments tending to unscrew the nut. The sleeve may be deformable and expanded into the hole by tightening the nut to adjust the hinge friction. Abutment shoulders 20, 22 may be provided to retain the arms in a given position when frictionally engaged.

9 Claims, 10 Drawing Figures

PATENTED JUN 24 1975
3,890,672
SHEET 1
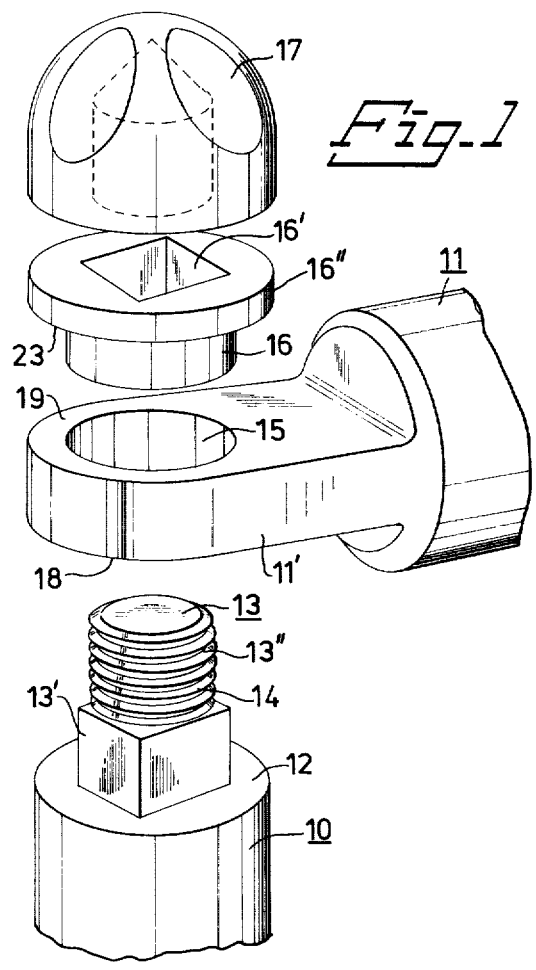
Fig.1
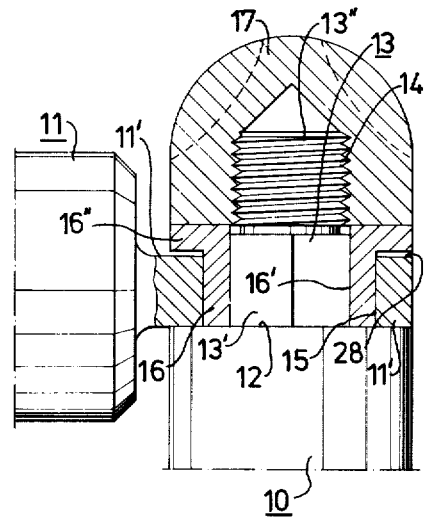
Fig.2
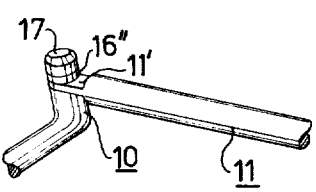
Fig.3
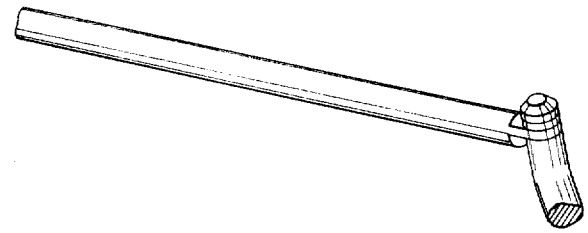

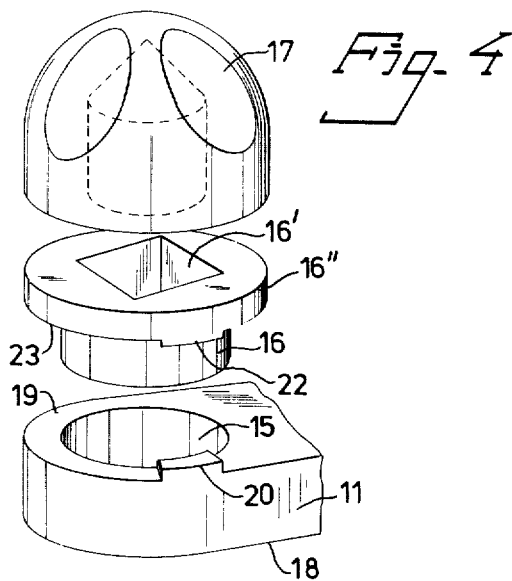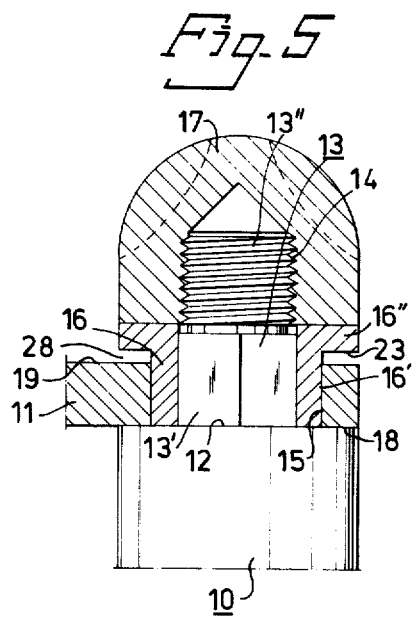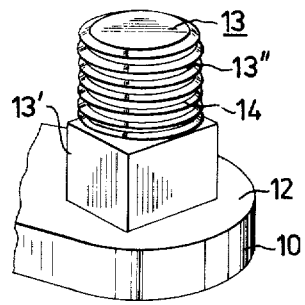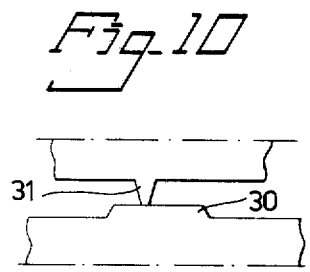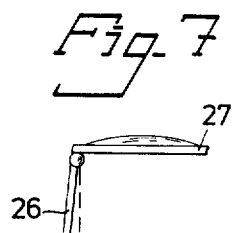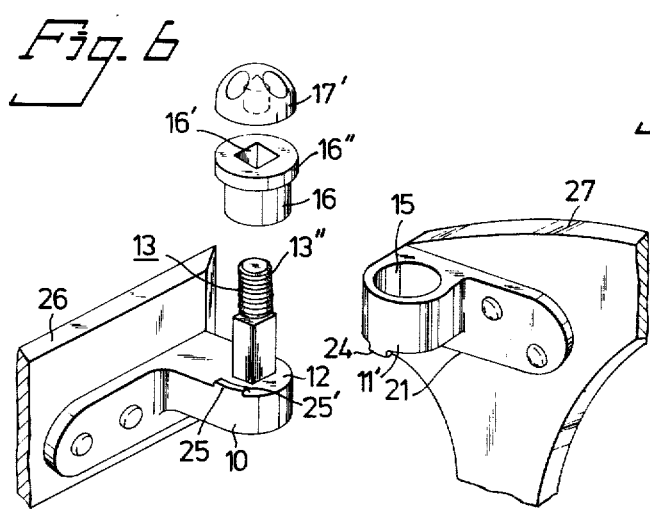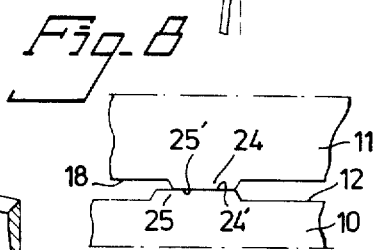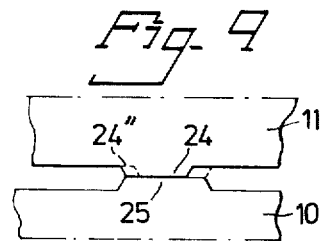

FRICTIONALLY ADJUSTABLE HINGE ASSEMBLY WITH NONROTATABLE HINGE PIN BEARING SLEEVE

BACKGROUND OF THE INVENTION

1. Field of the Invention

The invention relates to a hinge arrangement for mounting two elements for pivotal movement relative to each other. One of the elements has an abutment surface with a shaft extending therefrom, and the other is provided with a through-passing cylindrical bearing hole. A sleeve having an outwardly extending abutment portion and an external cylindrical bearing portion, is non-rotatably arranged for axial movement on the shaft and in the bearing hole with the abutment portion spaced from the abutment surface, on opposite sides of the hole and locking means are provided for fixing the axial position of the sleeve on the shaft.

2. Description of the Prior Art

Hinge arrangements of this kind are used, for example, on hinged flaps and doors. They are also used to hinge the arms of spectacles to spectacle frames and afford the advantage whereby the locking means, which normally comprises a threaded locking member, is not rotated when the hinged elements are pivoted relative to one another. With known hinge devices of this type, however, the bearing surfaces of the two elements, which surfaces are located at right angles to the shaft, are in direct contact with each other. Moreover, there is a danger of dirt entering the bearing surfaces, causing the same to bind and jam. This risk is particularly manifest in the case of such hinge devices having very small dimensions, such as with hinge devices of the type designed for spectacle frames.

SUMMARY OF THE INVENTION

An object of the present invention is therefore to provide a hinge arrangement of the aforementioned type with which the risk of jamming is at least substantially eliminated and with which any dirt which may enter the hinge can be readily removed, as by washing for example. Another object of the invention is to provide a hinge arrangement with which the force required to pivot the two elements relative to one another can be readily adjusted.

A further object is to provide a hinge arrangement of the aforementioned type with which locking of the two elements can be effected in one or more pivoting positions of said elements.

Accordingly, the present invention consists in a hinge arrangement for mounting two elements for pivotal movement relative to each other, of which elements one has an abutment surface and a shaft extending therefrom, and the other is provided with a through-passing cylindrical bearing hole, a sleeve having an outwardly directed abutment portion and an external cylindrical bearing portion being non-rotatably arranged for axial movement on the shaft and in the bearing hole, with the abutment portion spaced from the abutment surface on opposite sides of the hole, and in which arrangement locking means are provided for determining the axial position of the sleeve on the shaft, wherein the cylindrical bearing portion of the sleeve has an axial extension which exceeds the axial extension of the bearing hole, and wherein the end of the sleeve remote from the abutment portion is arranged to be held pressed by the locking means against the abutment surface.

BRIEF DESCRIPTION OF THE DRAWINGS

So that the invention will be more readily understood and further features thereof made apparent, a hinge device constructed in accordance with the invention will now be described with reference to the accompanying drawings, in which FIG. 1 illustrates the components of one embodiment of a hinge arrangement according to the invention, FIG. 2 is a side view, partly in section, of the hinge shown in FIG. 1, FIG. 3 shows two bearing devices according to FIG. 1 forming part of a linkage system, FIG. 4 shows components of a modified version of the hinge arrangement according to FIG. 1, FIG. 5 is an axial sectional view of the hinge arrangement shown in FIG. 4 in an assembled condition, FIG. 6 shows a modified hinge arrangement located between one of the two arms of a pair of spectacles and a spectacle frame, FIG. 7 is a simplified view of the arm in FIG. 6, and shows the arm in two angular positions within an arm locking area, FIG. 8 shows a first position of locking shoulders forming part of a locking device incorporated in the hinge shown in FIG. 6, FIG. 9 shows a second position of the locking shoulders, and FIG. 10 illustrates a modified locking means.

DESCRIPTION OF THE PREFERRED EMBODIMENTS

In the following, like elements are identified with like references.

The hinge arrangement shown in FIGS. 1 and 2 comprises a first hinge element 10 having a flat abutment surface 12 and a shaft or peg 13 extending at right angles to the plane of said surface. The end portion 13' of the shaft 13 adjacent said surface 12 is of non-round configuration, in the illustrated embodiment of square configuration, while the end portion 13" of said shaft remote from said surface is provided with screw threads 14. Arranged for co-action with the first element 10 is a second hinge element 11 which is provided with a cylindrical hole 15 in which there is pivotally mounted a bearing sleeve 16 having an inner hole 16' which is adapted to conform to the non-round end portion of the shaft 13. Thus, in its assembled position, the sleeve 16 is nonrotatably mounted relative to the hinge element 10. The sleeve 16 has on one face thereof a radially outwardly extending abutment portion 16" which has flat surface 23 which is intended to face a surface 19 located on the opposite side of said element from surface 18 and which is arranged to lie adjacent the surface 12 in the assembled condition of the hinge. The two surfaces 18 and 19 are flat and extend substantially parallel with one another, the perpendicular distance between said surfaces being smaller than the axial extension of the sleeve to the abutment surface 23. As will be seen from FIG. 2, there is thus formed between the bearing surface 23 and the bearing surface 19 a gap 28. A nut 17 is intended to be screwed onto threaded end portion 13" of the shaft 13, so that one end surface of said nut lies against a coacting surface of the abutment surface 16", to force the end of sleeve 16 against the abutment surface 12. The gap 28 allows the two hinge elements to pivot freely relative to one another. The only significant friction is that occurring between the cylindrical surface of the sleeve 16 and the cylindrical surface defining the hole 15, provided that there is a good fit therebetween. If the sleeve 16 is made from a deformable material, the frictional force can be varied by tightening the nut 17, whereupon the sleeve is radially widened and pressed against the wall of the hole 15. The axial extension of the non-round portion 13' of the shaft 13 is smaller than that of the sleeve.

Owing to the described construction, the nut 17 will not be subjected to rotational forces which would tend to loosen it. If desired, a locking washer may be arranged between the nut 17 and the flange 16'', or the mutually adjacent surfaces may be knurled, to facilitate the desired locking effect.

The sleeve 16 is suitably made of an elastomeric, plastics material or natural rubber. In this way, rotational movement of the hinge elements 10 and 11 relative to each other can be braked by causing the nut 17 to slightly compress the sleeve 16, thereby causing said sleeve to be pressed against the inner surface of the bearing hole 15 to exert a braking moment.

FIG. 3 illustrates the hinge arrangement according to FIGS. 1 and 2 used as part of a linkage system, for example in connection with a tie rod assembly of a motor vehicle.

A hinge constructed in accordance with the invention is particularly suitable for use in all cases where it is desired to have a hinge where friction constantly prevails between the movable parts thereof and with which there is no risk of the nut 17 being inadvertently unscrewed.

The portion 13' of the shaft 13 and the inner surface 16' of the sleeve 16 may have a different configuration to that shown, the important thing being that they are a non-round or the like configuration. Both the free end portions 13'' of the shaft 13 and the nut 17 may be provided with other engagement means than the illustrated threads 14. The abutment surfaces of the elements 10 and 11 and the abutment surfaces of the remaining bearing components may be convex or concave in shape, and need not be completely flat. The bearings and the element may be made of any appropriate kidn of material, although in many cases a plastics material is to be preferred.

It should be emphasized that the present invention is not limited in any way to a locking of the sleeve 16 in relation to the shaft 13 in the manner described and shown in the accompanying drawings, Thus, there is no requirement that the shaft 13 must necessarily be provided with a non-round portion 13' or that the interior 16' of the sleeve 16 shall be non-round. There are many other conceivable arrangements for locking the components against rotation, for example the end portion of the sleeve 16 facing the abutment surface 12 may be provided or arranged with engaging means, a key, for example, adapted to prevent rotation of the sleeve 16 relative to the shaft 13.

The embodiments of the invention as shown in FIGS. 4-10 are particularly suited for use as spectacle hinges and will therefore be described with reference to use with a pair of spectacles. It is emphasized, however, that the hinge device is not restricted to such use.

With the embodiment of FIG. 4, the bearing surface 19 is provided with a raised portion 20 which extends around the circumference of the hole 15, through a length of arc subtending an angle of 10° for example. The circular abutment surface 23 has provided thereon a similarly raised portion 22. The total combined height of the raised portions slightly exceeds the size of the gap 28 as seen axially. When the two hinge elements 10 and 11 are rotated relative to each other to a position corresponding to that shown in FIG. 4, the two shoulders 20 and 22 will slide up and be pressed together, to provide reliable locking of the hinge elements, subsequent to said elements being rotationally adjusted relative to each other. The opposed, mutually co-acting friction surfaces on the raised portions of shoulders 20, 22 are preferably flat and parallel to each other, whereby the greatest frictional force is obtained. As will be apparent from the following, only one of the shoulders, e.g., 20, need have a relatively long extension, the other having the form of a short shoulder. Alternatively, if the surface on the shoulder 20 has an extremely high coefficient of friction, the other raised portion may even have the form of a point. Such an embodiment is illustrated in FIG. 10, in which the raised portion 30 has a relatively long longitudinal configuration and has a surface with a high coefficent of friction, while the co-acting raised portion 31 is relatively short. With this embodiment full frictional locking is obtained in the positions between the right and left edges of the portion 30.

The position of the shoulders 20, 22 shown in FIG. 4 is assumed to correspond to the fully extended position of the arms of the spectacles. If locking of the arms is also desired when the arms are collapsed onto the frame portion of the spectacles, mutually co-acting raised portions may be arranged in positions corresponding to the desired locking positions. With this embodiment, only one surface, such as surface 19, need be provided with a raised portion for co-action with the portion 22 when the spectacles arms are collapsed onto the spectacle frame.

Although the two raised portions have been shown to be arranged on the surfaces 19 and 23, it will readily be perceived that they may also be arranged on the surfaces 12 and 18, and also on both pairs of surfaces.

If the shoulders 20, 22 should become worn, so that the desired degree of friction is not obtained, the nut 17 may be tightened to reduce the extent of the gap 28.

FIGS. 6-9 show a modified embodiment of the invention with which the hinge element 10 is secured to an arm of a pair of spectacles, while the other element 11 is secured to the spectacle frame 27. With this embodiment, the free end of the shaft 13 may be smoothed and connected with a stop means 17' by gluing instead of using the threaded connection shown.

The surface 12 of the hinge element 10 has an elongate shoulder 25 having a flat or at least a substantially flat friction surface 25'. The circular surface 18 of the other hinge element 11 has a shoulder 24 provided with a friction surface 24' which is substantially flat and which co-acts with the friction surface 25 when the spectacle arm 26 is extended. The surface 18 is also provided with a similar friction shoulder 21 which is arranged to co-act with the shoulder 25 when the spectacle arm is collapsed.

A simplified view of the position of the arm 26 relative to the frame or centre-piece 27 is shown in FIG. 7.

When the spectacles are to be worn, the respective spectacle arms are extended to the position shown in full lines in FIG. 7, whereupon they may be readily placed over the ears of the wearer. The abutment pressure exerted by the arms against the head of the wearer is, however, insufficient to hold the spectacles reliably in position, and the arms should therefore be pressed by the wearer in towards the head until a suitable abutment pressure is obtained. The spectacle arms will then be located in the position shown in dash lines in FIG. 7.

The positions adopted by the shoulders 24 and 25 as the spectacles are being extended ready for use are shown in FIG. 8, while the position of said shoulders subsequent to the adjustment being made for obtaining the said suitable abutment pressure is shown in FIG. 9.

As will be readily understood, it is essential that a full frictional force and locking effect is obtained subsequent to urging the spectacle arms to the desired position against the head of the wearer, and that only a small frictional force, or no friction at all, is obtained when the spectacles are initially placed in position. This implies that the shoulder 24 of the embodiment in FIG. 8 may be displaced further to the right in the Figure relative to the shoulder 25 and, for example, in the locked position may occupy the position shown with dash lines in FIG. 9.

As will be readily seen from FIGS. 8 and 9, outward deformation of a spectacle arm due to long and excessive use may be readily compensated for by displacing the arm inwardly through a corresponding amount, i.e. by moving the shoulder 24 further to the left in the Figure relative to the shoulder 25 whilst maintaining a good locking effect. To facilitate positive sliding of one shoulder on the other, the end surfaces of the shoulders are suitably chamfered, in the manner shown at 24" in FIG. 9 for example.

I claim:

1. In a hinge assembly including two elements (10,11) mounted for pivotal movement relative to each other, a first abutment surface (12) on a first of said elements, a shaft (13) extending outwardly from and perpendicular to said abutment surface and having a non-round lower portion (13') adjacent the first abutment surface and an upper portion, a flat web member (11') having upper and lower bearing surfaces extending from the second of said elements and defining a cylindrical bearing hole (15) therein through which the shaft extends, a sleeve (16) having an outwardly extending flange (16") defining a second abutment surface (23), a central passageway (16') having the same non-round configuration as the lower portion of the shaft, and an external cylindrical bearing surface, the sleeve being fitted over and axially slidable on the shaft with the non-round portion engaging the central passageway in a non-rotatable manner and the bearing surface accommodated within the bearing hole, and with the first and second abutment surfaces spaced from but facing each other and, respectively, facing said upper and lower bearing surfaces; of the web, and locking means (17) mounted on the upper portion of the shaft retaining the sleeve thereon, the improvements characterized by:
   a. the axial length of the external cylindrical bearing surface being greater than the thickness of the web, and
   b. the locking means engaging the upper portion of the shaft to such a depth that the end of the sleeve remote from the flange bears against the first abutment surface, whereby the shaft, sleeve and locking means assembly is rotatable in the bearing hole while having a limited end play defined by the difference between the axial length of the external cylindrical bearing surface and the thickness of the web.

2. A hinge assembly according to claim 1, wherein the sleeve is manufactured at least in part from a deformable material and is arranged to be widened radially into frictional engagement with the inner wall of the bearing hole under the influence of an axially directed force from the locking means.

3. A hinge assembly according to claim 1, wherein at least one bearing surface of the second element has a raised portion and a cooperating raised portion is provided on one of the abutment surfaces facing said one bearing surface, whereby the two elements may be rotated relative to each other through an angle over which the raised portions engage with and frictionally slide on each other, and wherein the total height of the two raised portions exceeds the difference between the axial length of the external cylindrical bearing surface and the thickness of the web, thereby to lock the two hinge elements together, and wherein at least one raised portion has a longitudinal extension of such magnitude that frictional locking is obtained within a determined angular range.

4. A hinge assembly according to claim 3, wherein at least one of said raised portions has a surface having a very high coefficient of friction.

5. A hinge assembly according to claim 4, wherein the other of said raised portions has a longitudinal extension which is smaller than the longitudinal extension of said one portion.

6. A hinge assembly according to claim 3, wherein the raised portions are substantially flat and extend generally parallel to one another.

7. A hinge assembly according to claim 1, wherein the locking means comprises a nut screwed onto the shaft.

8. A hinge assembly according to claim 7, wherein the sleeve is made from a deformable material.

9. A hinge assembly according to claim 8, wherein said material is an elastic material.

* * * * *